United States Patent [19]

Burandt

[11] Patent Number: 4,961,406

[45] Date of Patent: Oct. 9, 1990

[54] METHOD AND DEVICE FOR OPTIMIZING THE AIR-FUEL MIXTURE BURN RATE OF INTERNAL COMBUSTION ENGINES DURING LOW SPEED, LIGHT AND HEAVY LOAD OPERATING CONDITIONS

[75] Inventor: Corliss O. Burandt, Plymouth, Minn.

[73] Assignee: Investment Rarities Incorporated, Minneapolis, Minn.

[21] Appl. No.: 178,467

[22] Filed: Apr. 7, 1988

[51] Int. Cl.$^5$ ................................................ F01L 1/34
[52] U.S. Cl. ............................... 123/90.15; 123/90.17
[58] Field of Search ................. 123/90.15, 90.16, 90.2, 123/90.21, 425, 501, 90.17, 90.18

[56] References Cited

U.S. PATENT DOCUMENTS

| | | | |
|---|---|---|---|
| 2,470,709 | 5/1949 | MacMillan | 123/425 |
| 4,131,096 | 12/1978 | Mitchell | 123/90.15 |
| 4,305,352 | 12/1981 | Oshima et al. | 123/90.15 |
| 4,438,737 | 3/1984 | Burandt | 123/90.17 |
| 4,497,303 | 2/1985 | Murayama et al. | 123/501 |

Primary Examiner—Willis R. Wolfe
Assistant Examiner—M. Macy
Attorney, Agent, or Firm—Sten Erik Hakanson

[57] ABSTRACT

The present invention concerns a method and device for optimizing the air-fuel mixture burn rates of an internal combustion engine in accordance with detonation limited control parameters during low speed, light and heavy load operating conditions. In particular, the present invention is preferably used with an engine having variable valve events that provide for a low speed, small valve event, and for earlier than normal intake valve closing. The method and device herein including phasing control of the operation of the camshaft of the engine with the operation of the crankshaft of the engine. The invention herein also including sensing of engine load and detonation. The phasing is controlled by a servo motor in response to signals produced from the sensing of load demand and/or detonation. The servo motor causing retarding of the phasing of the camshaft to the crankshaft in response to signals indicating a light load demand on the engine, and advancing the operation of the camshaft to the crankshaft in response to signals indicating heavy load demand on the engine or detonation. The retarding causing an increase in the air-fuel mixture burn rate and the advancing causing a decrease in the air-fuel mixture burn rate.

10 Claims, 1 Drawing Sheet

METHOD AND DEVICE FOR OPTIMIZING THE AIR-FUEL MIXTURE BURN RATE OF INTERNAL COMBUSTION ENGINES DURING LOW SPEED, LIGHT AND HEAVY LOAD OPERATING CONDITIONS

Background of the Invention

1. Field of the invention

The present invention relates generally to internal combustion engines of the four cycle type, and more specifically to methods and device s for affecting the size and timing of valve events as related to air-fuel mixture burn rates for the optimizing of engine performance at various engine speeds.

2. Description of the Prior Art

The desirability of providing for an internal combustion engine having the capacity to regulate, while running, the size and duration of its valve events so as to optimize engine performance under different running conditions is well recognized. Valve event mechanisms have been proposed to achieve this goal, as seen, for example, in U.S. Pat. No. 3,211,137 issued to Love on Oct. 12th, 1965, and in U.S. Pat. No. 4,723,515 issued to applicant on Feb. 9th, 1988. Such mechanisms can provide for "smaller" intake valve events, i.e . less duration and/or lift, during low speed operation when less fuel mixture is needed, and "large" intake valve events, i.e. greater lift and/or duration, during high speed operating conditions when more air-fuel mixture is needed. This situation is in contrast to a traditional fixed valve event engine that must accept greater operational compromises.

As seen in SAE paper 680399 "Intake Valve Throttling", Donald L. Stivender, air-fuel mixture burn rates increase as valve lifts are reduced. It is desirable to increase burn rates under low load, low speed operating conditions. Under such conditions the among of air and fuel introduced into the cylinder is relatively small, hence the effective compression ratio is generally not large enough to cause harmful, and energy wasting premonition or detonation. Also, a faster burn can allow for more complete oxidation of the fuel resulting in more available power and increased efficiency. Thus, a valve event mechanism that provides for a smaller valve event, at least with respect to lift, can cause the more desirable faster air-fuel mixture burn rate to occur at low engine speeds.

However, As shown in SAE paper 850074 "Effects of Intake-Valve Closing Timing on Spark-Ignition Engine Combustion" Seinosuke Hara et. al., earlier than normal intake valve closing decrease air-fuel mixture burn rates. A reduction in burn rate reduces the tendency for detonation to occur. This situation is desirable under conditions of heavy engine load at low speeds the rein detonation is more likely to take place due to the increased effective compression ratio that results from the larger volume of fuel being delivered to the engine's cylinder or cylinders. Thus, an engine designed to allow for early intake valve closings, could also, for a given octane fuel, be designed with a greater expansion ratio to provide for the increased power and fuel economy that results therefrom. The means for providing for earlier than normal intake valve closing is well known in the art, and is primarily a function of camshaft design and camshaft phasing with respect to the engine's crankshaft. However, a traditional fixed valve event engine having an advanced intake valve event would not be practical in most real life applications such as for use in an automobile. The problem concerns the fact that at high speed under a heavy load the early intake valve event would be unduly restrictive of fuel mixture flow to the cylinder. Thus, such an engine would, at high speeds, operate at decreased volumetric efficiency, which would result in significant power loss.

A valve event mechanism providing for large and small intake valve events could be set-up to allow for early intake valve evente at low speeds. Unfortunately, an engine designed to provide for earlier than normal intake valve closing at low speeds will always have such early closings regardless of load condition being experienced by the engine. In other words, such an engine will be optimized for operation under a heavy load at low speeds due to the decreased air-fuel mixture burn rate promoted by the early closing, but not for operation with a light load at low speeds where a faster burn rate would be preferable. Therefore, it would be very desirable to have an internal combustion engine capable of optimal operation during both light load, low speed and heavy load, low speed conditions.

SUMMARY OF THE INVENTION

The objects of the present invention include, but are not limited to, the following:

1. To provide a control method and apparatus for an internal combustion engine that optimizes air-fuel mixture burn rates under low speed. Light and heavy load operating conditions.

2. To provide a control method and apparatus that is sensitive to engine detonation for permitting the use of engines having higher expansion ratios without requiring increases in fuel octane rating.

3. To allow an internal combustion engine to develop more power from a fuel of a given octane rating.

4. To allow an internal combustion engine to operate with increased fuel efficiency.

5. To provide a method and control apparatus that is uncomplicated, and easy and inexpensive to manufacture and use.

The present invention concerns a method and apparatus for optimizing the operation of a four cycle internal combustion engine under both low speed-heavy load, and low speed-light load conditions. Low speed for purposes herein means engine speeds generally less than 2,500 revolutions per minute (RPM). The invention herein is preferably used with an internal combustion engine having a valve event mechanism that allows for relatively small valve events at low speeds. A small event, for purposes hereing is generally an intake valve event that provides for maximum volumetric efficiency at engine speeds less than 2,500 RpM. Also, the present invention is preferably used with a valve event mechanism wherein the intake valve events are preselected to provide for earlier than normal intake valve closings at low speed operating conditions. Earlier than normal intake valve closing, for purposes herein, refers to the intake valve being substantially closed before bottom dead center of the piston on its intake stroke.

The method and apparatus of the invention here in concerns, in general, the differentiating between light load and heavy load conditions at low speeds, and adjusting the timing of the low speed intake valve events of the engine in response thereto for optimal operation. Specifically, optimal operation under low speed heavy load, and low speed light load conditions with respect to intake valve operation requires earlier than normal intake valve closing and later than normal intake valve closing respectively. Thus, the method herein first involves sensing the load on the engine, then adjusting the phasing, or the rotational relationship, of the crankshaft of the engine with the camshaft thereof in response to the sensed load. In particular, retarding the phasing of the camshaft to the crankshaft under light load conditions, and advancing such phasing when a heavy load is sensed.

The apparatus of the present invention includes a phasing mechanism for adjusting the phasing of the camshaft to the crankshaft. The phasing device is mechanically operable to advance or retard the motion of the camshaft to the crankshaft. A vacuum sensing device is connected to the intake manifold of the engine and a detonation sensor is in communication with a cylinder or cylinders o f the engine. A servo motor is connected to each of the sensors for receiving signals therefrom. The servo motor is mechanically connected to the phasing device to provide for operation thereof.

The operation of the applicant's invention can now be understood where, conditions of high intake manifold vacuum indicate that relatively little air-fuel mixture is being delivered to the cylinders, and thus, that the engine is experiencing a light load. The vacuum seen or then signals the servomotor to operate the phasing mechanism in such a manner that the action of the camshaft is retarded with respect to the crankshaft causing the intake valve closing to occur at a point closer to the time of ignition of the air and fuel. As a result thereof, a faster burn rate occurs, which faster burn rate enhances fuel efficiency and economy of operation.

Conversely, sensing of low manifold vacuum or detonation indicates heavy load operating conditions. Thus, a signal or signals are sent to the servo motor to operate the phasing mechanism so that the motion of the camshaft with respect to the crankshaft is advance causing an increase in the time lapse between the closing of the intake valve and the ignition of the air-fuel mixture. The resulting decreased burn rate eliminating, or at least minimizing the occurrence of detonation.

It can now be appreciated that the present invention provides a method and apparatus for optimizing the air-fuel mixture burn rate of an internal combustion engine in accordance with detonation limiting considerations in a manner that optimizes power output during low speed-high load conditions and increases fuel efficiency during low speed-light load conditions. Furthermore , it can be seen that by decreasing burn rates, and therefore detonation at heavy load operating conditions, the invention herein permits the use of engines having higher expansion ratios.

BRIEF DESCRIPTION OF THE DRAWINGS

A more thorough understanding of the operation and objects and advantages of the present invention can be had by reference to the following detailed description read in conjunction with the figures referenced thereIn, and briefly described below, wherein.

DETAILED DESCRIPTION OF THE INVENTION

Figure 1:
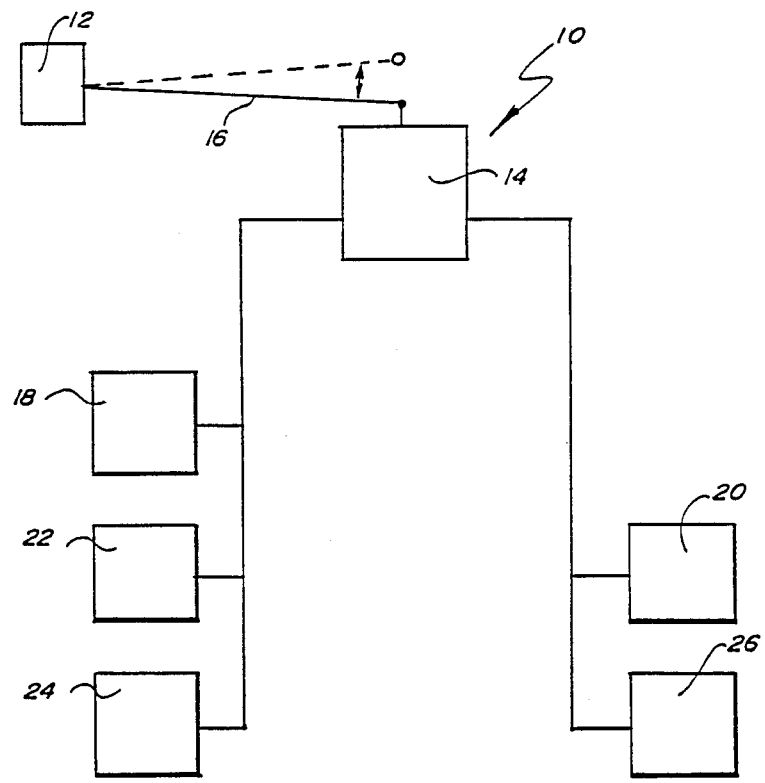
FIG. 1 is a block diagram on the present invention.

The method and apparatus of the present invention is represented in block diagram form, as seen in FIG. 1. The invention herein concerns the optimizing of air-fuel mixture burn rates in an internal combustion engine during low speed, heavy and light load operating conditions, In particular, providing for a fast air-fuel mixture burn rate during light load low speed operation, and a slow air-fuel mixture burn rate during heavy load low speed operation, Maximum benefit from the invention herein is obtained when used on an internal combustion engine having a valve event mechanism for providing small, low speed, intake valve events. Many valve event mechanisms are known in the art, and are suitable for providing such intake valve events. See for example, applicant's U.S. Pat. No. 4,723,515 issued on Feb. 9th, 1988, which patent is incorporated herein by reference. The valve mechanism described there in is conventional in the sense that it concerns spring biased, camshaft activated valves. However, that mechanism allows the lift and duration of the individual valve events to be adjusted during operation of the engine so as to maximize the performance thereof. In, particular this valve mechanism provides for increased valve lift and duration, large valve events, during high speed engine operating conditions when greater power is needed, and decreased valve lift and duration, small valve events, during low speed operating conditions when less power is needed. Applicant's valve event device as described in the '515 patent allows for continuously variable valve events as a function of engine speed. However, although other valve event mechanisms provide for only two discreet events, i.e. a low speed and a high speed event, such dual event mechanisms are also suitable for use with the present invention. A low speed , small valve event is necessary to obtain maximum variation of air-fuel mixture burn rate.

Also, to take full advantage of the improvements in engine performance afforded by the present invention, it is desirable to use in conjunction therewith, an engine having earlier than normal intake valve closings, an addition to having a low-speed small valve event. Early intake valve closing is provided for by the design of the engine's camshaft, and the phasing relationship of the camshaft to the crankshaft of the engine. Such early intake valve events are needed to allow for decreased air-fuel mixture burn rates As seen in FIG. i, a burn rate optimizing apparatus for performing the method of the present invention is generally designated 10 and includes a phasing mechanism 12 for adjusting the phasing relationship of the camshaft and crankshaft of an internal combustion engine (not shown). Many such phasing control devices are known in the art, a suitable device being described in U.S. Pat. No. 3,441,009 granted to Rafanelli issued on Apr. 29th, 1969, which patent is incorporated herein by reference. Such a device generally include sale over arm or actuating means that is operated by a control device to change the phasing, i.e. advance or retard, the operational relationship of the camshaft relative to the crankshaft. Typically such phasing means, as seen in the '009 Rafanelli patent, operate to adjust phasing by stretching or relaxing a drive chain extending around drive sprockets of the camshaft and crankshaft. This chain stretching is accomplished by interaction of the lever arm and the chain, with the amount of stretching. Hence the degree of phase change, regulated by the control device.

An electrical servo motor 14 is used to regulate phasing means 12 through connection therewith, and by operation of, lever arm 16 of phasing means 12. Thus, lever arm 16 is used ed to operate phasing device 12 so as to advance or retard the motion of the camshaft to the crankshaft, as is indicated by the dashed outline of arm 16 and the arrow showing such two-directional movement. Various other servo or control means could also be used including hydraulic or electro-mechanical devices.

A heavy load seeing device is and a light load sensing device 20 are in electrical communication with motor 14. Sensors 18 and 20 are preferably vacuum sensors affixed to the intake manifold of the engine being regulated by the present invention, and, as is well known in the art, can indicate load on the engine as a function of the amount of vacuum in the intake manifold the re of. Specifically, a heavy load is indicated by a low manifold vacuum, and a light load is indicated by a high manifold vacuum. Sensors 18 and 20 send electrical signals to motor 14 to control the movement thereof, and thus, to ultimately regulate the operation of phasing means 12 whereby a heavy load results in the phasing of the camshaft relative to the crankshaft being advanced and a light load causing such phasing to be retarded. It will be appreciated that there exist other ways of sensing the load on an engine such as determining the volume of combustion air flow as a function of engine speed Engine load sensing other than amount of intake manifold vacuum may be necessary, particularly in intake valve throttled engines. It will also be appreciated that a single sensor can be used to indicate both heavy and light engine load.

A detonation sensor 22 is in electrical communication with motor 14. Detonation sensors, well known in the art, are located in close proximity to the combustion chamber(s) of the engine. Sensor 22 produces electrical signals that are sent to motor 14 so that the phasing of the camshaft relative to the crankshaft is advanced then detonation is sensed.

The basic operation of the method and apparatus of the present invention can now be understood. Phasing means 12 is used in conjunction with an internal combustion engine, not shown, for providing phasing control of the operation of the camshaft of the engine relative to the crankshaft thereof. During low speed, light load operating conditions sensor 20 will sense such light load and send an electrical signal to motor 14 causing operation of lever arm 16 in a direction that results in phasing means 12 retarding the phasing relationship of the camshaft to the crankshaft. The intake valve or valves of the engine will then be caused to close later than normal causing the air-fuel mixture burn rate to increase. The faster burn rate is desirable to promote more complete oxidation of the fuel.

During a heavy load, sensor 18 sends electrical signals to motor 14 that result in the phasing relationship of the camshaft to the crankshaft being advanced. This advancing results in the intake valve closing occurring earlier than normal thereby causing the air-fuel mixture burn rate to decrease. This slower burn rate is desirable as it reduces the tendency for detonation to occur. In a similar manner as with sensor 18, sensor 22 causes an advancing of the camshaft-crankshaft relationship through signals sent to motor 14 Detonation indicates that the air-fuel mixture is igniting too rapidly. Therefore, as with the sensing of a heavy load, an earlier than normal intake valve closing is needed. It will be apparent that it may be necessary in some applications to have sensor 22 predominate in magnitude and/or effect as to control of engine phasing with respect to such control by sensors 18 or 20, as detonation must generally always be avoided.

The present invention also includes the use of emission sensors 24 and 26 in electrical connection with motor 14 and in communication with the exhaust gases produced by the engine Emission detecting devices are known that are sensitive to a wide range of undesirable combustion by-products, such as oxides of nitrogen or carbon monoxide Such an emission parameter or parameters can be detected by sensors 24 and/or 26 whereby the detected presence thereof affects the phasing control of the engine. Such by-products are oftentimes the result of incomplete combustion as caused in part by detonation or undesirable air-fuel mixture burn rates. Thus, for example, detection of carbon monoxide during heavy load operation may require advancing so that detonation is decreased, or detection thereof during light load operation may require retarding so that burn rate is increased. Also, pollution control objectives may require advancing or retarding of camshaft-crankshaft operation opposite to what would be considered optimal engine operation as has been described herein as directed by sensors 28, 22 and 20. Thus, sensor 24 can also be electrically connected to sensors 22 and 18 as will be understood in the art. To override the signals produced thereby. Likewise sensor 26 can also be electrically connected to sensor 20 to override, under certain conditions, the signals produced thereby.

Figure 2:
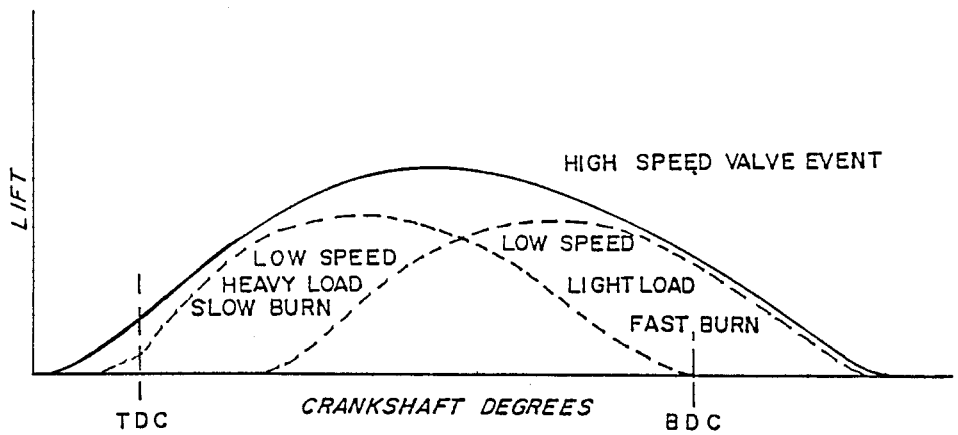
FIG. 2 is a graphical representation of the effect of the present invention on the fuel mixture burn rates as related to intake valve operation.

FIG. 2 shows a graphical representation of the effects of the present invention on an internal combustion engine having a large and small intake valve event. The large intake valve event for high speed operation is represented by the bold curve. This large event is not a primary focus of the present invention, but is included to show the relationship thereof to the small low speed valve event below the area thereof as represented by the two curved dashed lines. Moreover, the present invention will be of great benefit in automotive applications, wherein it is, of course, desirable to have an engine that can also operate efficiently in the high speed range. Top dead center (TDO) of the intake stroke, and bottom dead center (BDO) of the intake stroke are indicated on the horizontal crankshaft degrees axis. The graph of FIG. 2 shows the ability of the present invention to advance or retard the low speed valve event between the two dashed curves that represent the optimal settings for low speed, heavy load and low speed light load operation. Thus. it can be seen that the present invention changes camshaft phasing relative to the crankshaft to advance or retard the timing of intake valve closing thereby increasing or decreasing respectively, the air-fuel mixture burn rate. It can also be seen that for optimal operation of the present invention a small intake valve event is needed. A large event, as used in a fixed valve event engine, is a necessary compromise for high speed, high power operation. However, such a large event would greatly reduce the ability of the invention herein to adjust the timing of the low speed intake valve closing due to the unavoidable losses of volumetric efficiency. Advancing a large intake event could result in exhaust cases being forced into the intake manifold, whereas retarding of the large event would not generate the amount of increased air fuel mixture movement that could be obtained with a smaller valve event. However, the invention herein would be of value in a conventional engine having only a single fixed large event provided the air-fuel mixture gas delivered to the cylinder or cylinders of the engine at higher than ambient atmospheric pressure. For example, as through the use of turbocharging or supercharging. In this case, the present invention can be used to advance the timing of the camshaft to the crankshaft during high load operation to decrease any detonation. The losses of volumetric efficiency being compensated for by the use of the high pressure air-fuel mixture delivery system.

It will be apparent to those of skill in the art that the dimension of various factors, such as valve lift and duration, degree of advancing or retarding, or timing of intake valve closing are dependent on a multitude of variables. Such variables include, engine displacement, number of cylinders type of air-fuel delivery system, the use to which the engine will be put, and so forth. It is not feasible, nor is it necessary, to describe such specific parameters, as such details are well within the skill of the art to determine for a specific application of the present invention.

What is claimed is:

1. A method for optimizing low speed light load and low speed heavy load operating conditions in an internal combustion engine having a camshaft, a crankshaft, at least one intake valve and at least on piston, and the engine capable of providing for small valve events;, and the engine providing for earlier than normal intake valve closings, the method comprising the steps of, sensing the load demand on the engine, regulating the phasing of the operation of the camshaft of the engine with the operation of the crankshaft of the engine in response to the sensed load demand by advancing the operation of the camshaft relative to the operation of the crankshaft when a heavy load demand is sensed and by retarding the operation of the camshaft relative to the operation of the crankshaft when alight load demand is sensed, and sensing detonation int he engine and regulating the phasing operation of the camshaft relative to the operation of the crankshaft by advancing the operation of the camshaft relative to the crankshaft when detonation is sensed.

2. A method for optimizing low speed light load and low speed heavy load operating conditions in an internal combustion engine having a camshaft, a crankshaft, at least one intake valve and at least one piston, and the engine capable of providing for small valve events, and the engine providing for earlier than normal intake valve closings, the method comprising the steps of, sensing the load demand on the engine, regulating the phasing of the operation of the camshaft of the engine with the operation of the crankshaft of the engine in response to the sensed load demand by advancing the operation of the camshaft relative to the operation of the crankshaft when a heavy load demand is sensed and by retarding the operation of the camshaft relative to the operation of the crankshaft when a light load demand is sensed, and sensing detonation in the engine and regulating the phasing operation of the camshaft relative to the operation of the crankshaft by advancing the operation of the camshaft relative to the crankshaft when detonation is sensed, and sensing engine emissions and retarding the phasing operation of the camshaft relative to the operation of the crankshaft when an increased air-fuel mixture burn rate is desired and advancing the phasing operation of the camshaft relative to the crankshaft when a decreased air-fuel mixture burn rate is desired.

3. A method for optimizing low speed light load and low speed heavy load operating conditions in an internal combustion engine having a camshaft, a crankshaft, at least one intake valve and at least one piston, the engine capable of providing for large and small valve events, and the engine providing for earlier than normal intake valve closings, the method comprising the steps of, sensing the load demand on the engine, regulating the phasing of the operation of the camshaft of the engine with the operation of the crankshaft of the engine in response to the sensed load demand by advancing the operation of the camshaft relative to the operation of the crankshaft when a heavy load demand is sensed and by retarding the operation of the camshaft relative to the operation of the crankshaft when a light load demand is sensed, and sensing detonation in the engine and regulating the phasing operation of the camshaft relative to the operation of the crankshaft by advancing the operation of the camshaft relative to the crankshaft when detonation is sensed.

4. A method for optimizing low speed light load and low speed heavy load operating conditions in an internal combustion engine having a camshaft, a crankshaft, at least one intake valve and at least one piston, the engine capable of providing for large and small valve events, and the engine providing for earlier than normal intake valve closings, the method comprising the steps of, sensing the load demand on the engine, regulating the phasing of the operation to the camshaft of the engine with the operation of the crankshaft of the engine in response to the sensed load demand by advancing the operation of the camshaft relative to the operation of the crankshaft when a heavy load demand is sensed and by retarding the operation of the camshaft relative to the operation of the crankshaft when a light load demand is sensed, and sensing detonation in the engine and regulating the phasing operation of the camshaft relative to the operation of the crankshaft by advancing the operation to the camshaft relative to the crankshaft when detonation is sensed, and sensing engine emissions and retarding the phasing operation of the camshaft relative to the operation of the crankshaft when an increased air-fuel mixture burn rate is desired and advancing the phasing operation of the camshaft relative to the crankshaft when a decreased air-fueled mixture burn rate is desired.

5. A method for optimizing low speed light load and low speed heavy load operating conditions in an internal combustion engine the engine having a camshaft, a crankshaft, at least one intake valve and at least one piston and having a continuously variable valve event mechanism, and the engine providing for earlier than normal intake valve closings, the method comprising the steps of, sensing the load demand on the engine, regulating the phasing of the operation of the camshaft of the engine with the operation of the crankshaft of the engine in response to the sensed load demand by advancing the operation of the camshaft relative to the operation of the crankshaft when a heavy load demand is sensed and by retarding ht operation of the camshaft relative to the operation of the crankshaft when a light load demand is sensed, and sensing detonation in the engine and regulating the phasing operation of the camshaft relative to the operation of the crankshaft by advancing the operation of the camshaft relative to the crankshaft when detonation is sensed.

6. A method for optimizing low speed light load and low speed heavy load operating conditions in an internal combustion engine the engine having a camshaft, a crankshaft, at least one intake valve and at least one piston, and the engine having a continuously variable valve event mechanism, and the engine providing for earlier than normal intake valve closings, the method comprising the steps of, sensing the load demand on the engine, regulating the phasing of the operation of the camshaft of the engine with the operation of the crankshaft of the engine in response to the sensed load demand by advancing the operation of the camshaft relative to the operation of the crankshaft when a heavy load demand is sensed and by retarding the operation to the camshaft relative to the operation of the crankshaft when a light load demand is sensed, and sensing detonation in the engine and regulating the phasing operation of the camshaft relative to the operation of the crankshaft by advancing the operation of the camshaft relative to the crankshaft when detonation is sensed, and sensing engine emissions and retarding the phasing operation o the camshaft relative to the operation of the crankshaft when a increased air-fuel mixture burn rate is desired and advancing the phasing operation of the camshaft relative to the crankshaft when a decreased air-fuel mixture burn rate is desired.

7. A method for optimizing high speed heavy load operating conditions in an internal combustion engine having a camshaft, a crankshaft, at least one intake valve and at least one piston, and the engine providing for earlier than normal intake valve closings, the method comprising the steps of, sensing the load demand on the engine, regulating the phasing of the operation of the camshaft of the engine with the operation of the crankshaft of the engine in response to the sensed load demand by advancing the operation of the camshaft relative to the operation of the crankshaft when a heavy load demand is sensed and by retarding the operation of the camshaft relative to the operation of the crankshaft when a light load demand is sensed, and sensing detonation in the engine and regulating the phasing operation of the camshaft relative to the operation of the crankshaft by advancing the operation of the camshaft relative to the crankshaft when detonation is sensed.

8. A method for optimizing high speed heavy load operating conditions in an internal combustion engine having a camshaft, a crankshaft, at least one intake valve and at least one piston, and the engine providing for earlier than normal intake valve closings, the method comprising the steps of, sensing the load demand on the engine, regulating the phasing of the operation of the camshaft of the engine with the operation of the crankshaft of the engine in response to the sensed load demand by advancing the operation of the camshaft relative to the operation of the crankshaft when a heavy load demand is sensed and by retarding the operation of the the camshaft relative to the operation of the crankshaft when a light load demand is sensed, and sensing detonation in the engine and regulating the phasing operation of the camshaft relative to the operation of the crankshaft by advancing the operation of the camshaft relative to the crankshaft when detonation is sensed, and sensing engine emissions and retarding the phasing operation of the camshaft relative to the operation of the crankshaft when a increased air-fuel mixture burn rate is desired and advancing the phasing operation of the camshaft relative to the crankshaft when a decreased air-fuel mixture burn rate is desired.

9. A device for optimizing the burn rate of an internal combustion engine having a camshaft, and a crankshaft, which comprises: phasing means for advancing or retarding the operation of the camshaft of the engine relative to the crankshaft of the engine, control means connected to the phasing means for operating the phasing means, engine load sensing means connected to the control means, the sensing means producing signals in response to the heavy engine load and light engine load, the control means responsive to the signals for regulating the operation of the phasing means so that the operation of the camshaft relative to the crankshaft is advanced when the sensing means detects a heavy engine load and retarded when the sensing means detects a light engine load, detonation sensing means, the detonation sensing means connected to the control means for sending signals thereto, the control means responsive to the signals produced by the detonation means for regulating the operation of the phasing means so that the operation of the camshaft to the crankshaft is advanced when detonation is sensed, and emission sensing means connected to the control means for sending signals thereto, the control means responsive to the signals produced by the emission sensing means for regulating the operation to the phasing means so that the operation of the camshaft relative to the crankshaft is advanced when a decreased air-fuel mixture burn rate is desired and retarded when an increased air-fuel mixture burn rate is desired.

10. A device for optimizing the burn rate of an internal combustion engine, having a camshaft, and a crankshaft, under low speed, light load and low speed, heavy load operating conditions, which comprises, phasing means for advancing or retarding the operation of the camahft of the engine relative to the crankshaft of the engine, control means connected to the phasing means for operating the phasing means, engine load sensing means connected to the control means, the sensing means producing signals in response to heavy engine load and light engine load, the control means responsive to the signals for regulating the operation of the phasing means of that the operation of the camshaft relative to the crankshaft is advanced when the sensing means detects a heavy engine load and retarded when the sensing means detects a light engine load, detonation sensing means, the detonation sensing means connected to the control means for sending signals, thereto, the control means responsive to the signals produced by the detonation means for regulating the operation of the phasing means so that the operation of the camshaft to the crankshaft is advanced when detonation is sensed, and emission sensing means connected to the control means for sending signals thereto, the control means responsive to the signals produced by the emission sensing means for regulating the operation of the phasing means so that the operation of the camshaft relative to the crankshaft is advanced when decreased air-fuel mixture burn rate is desired and retarded when an increased air-fuel mixture turn rate is desired.

* * * * *